W. THOMPSON.
TIRE BUILDER'S TOOL.
APPLICATION FILED AUG. 27, 1915.

1,230,947. Patented June 26, 1917.

WITNESS:
S. H. Taylor

INVENTOR
William Thompson,
BY
Ernest Hopkinson
HIS ATTORNEY

UNITED STATES PATENT OFFICE.

WILLIAM THOMPSON, OF DETROIT, MICHIGAN, ASSIGNOR TO MORGAN & WRIGHT, A CORPORATION OF MICHIGAN.

TIRE-BUILDER'S TOOL.

1,230,947. Specification of Letters Patent. Patented June 26, 1917.

Application filed August 27, 1915. Serial No. 47,598.

*To all whom it may concern:*

Be it known that I, WILLIAM THOMPSON, a citizen of the United States, residing at Detroit, county of Wayne, and State of Michigan, have invented certain new and useful Improvements in Tire-Builders' Tools, of which the following is a full, clear, and exact description.

This invention relates to tire builders' tools and has for an object to provide a device for promoting the quick and easy transfer of unvulcanized rubber treads from the forming calender to the books with minimum manual labor.
In the manufacture of tires, the tread portion is formed separately from the carcass portion, and is usually formed by passing raw or unvulcanized rubber stock through a calender, the delivery roll of which is engraved to give the tread somewhat the form which it will have in the product. The tread is discharged from the calender in the form of a strip from eight to ten inches wide, and about eight feet long and is conducted from the calender by an endless conveyer. Usually it was required that one man stand at the center of the conveyer and cut the tread. A second man stood at the end of the apron and held the shell upon which the tread was rolled. This man handed the said rolled up tread to a third man, who unrolled it onto the book, while a fourth man rolled up the liner strip.

The present invention provides a device whereby the services of two of the unskilled laborers above referred to are dispensed with, viz., the man who rolled up the liner and the man who held the shell at the end of the apron, and the treads are removed from the conveyer and placed in the book, at the same time being prevented from sticking together.

With the above objects in view the invention consists in novel details of construction and combinations of parts hereinafter fully described and claimed, it being understood that various modifications may be resorted to within the scope of the appended claims without sacrificing any of the advantages or departing from the spirit of the invention.

The invention can be readily understood from the following description taken in connection with the accompanying drawing, in which—

Figure 1:
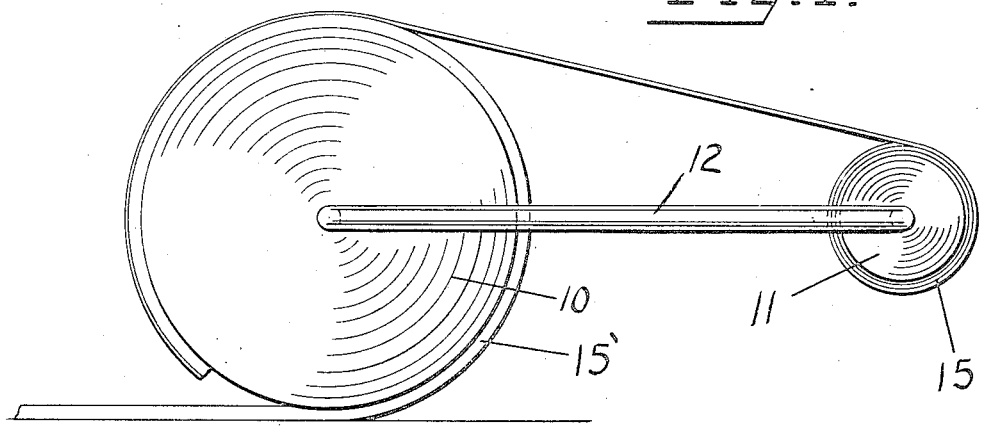
Figure 1 is a side elevation of the device.
Figure 2:
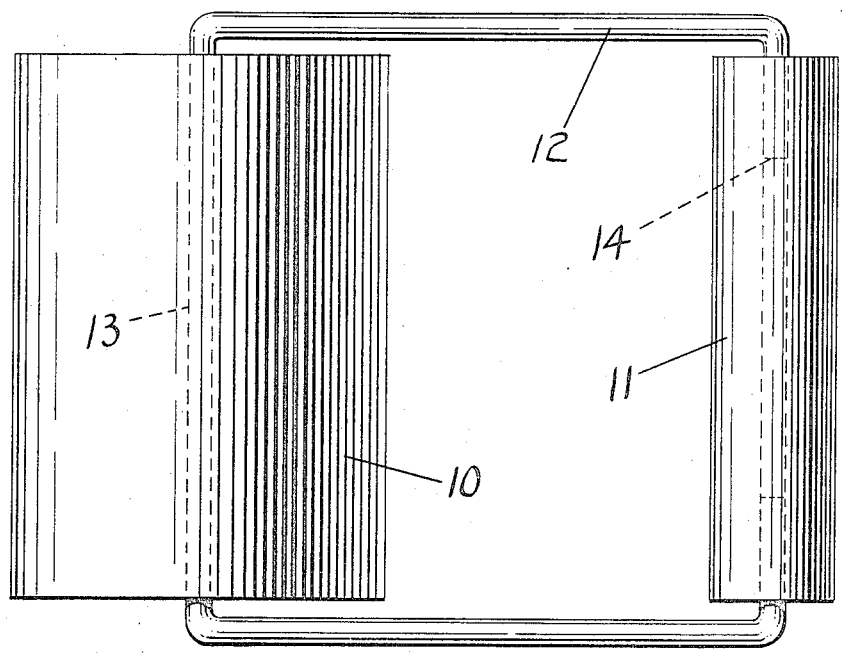
Fig. 2 is a plan view.

Referring now to the drawing, the device is shown to comprise a roller 10 of relatively large diameter and a roller 11 of relatively small diameter, these rollers being equal in length and being connected in spaced relation by a link 12, the ends of which form shafts 13 and 14, upon which the rollers turn freely. Upon the small roller 11 is spooled a liner strip 15 of muslin or like material.

In operation the operator rolls the large roller 10 over the tread 15' discharged by the calender, taking care to first apply the end of the liner strip to the end of the tread, so that the tread winds itself spirally upon the large roller, each convolution of the tread having over it a convolution of the liner strip which is unwound from the small roller 11 by the rotation of the large roller. The operator then transfers the tread to the book by rolling the large roller 10 along the book so as to unwind the tread on to the book, and at the same time he spools the liner strip upon the small roller by allowing the small roller to frictionally engage the surface of the tread and be rotated thereby. Thus as the device moves along, the tread is simultaneously unrolled from the large roller 10 and the liner strip spooled upon the small roller 11 so that it is again ready for use.

What I claim is:

1. A tire builder's hand tool, comprising a suitable frame, rollers having parallel axes, rotatably mounted thereon, one of said rollers being adapted to have a liner strip wound thereon, said strip being arranged to be supplied by rotation of the other roller, between the convolutions of a tread being wound thereon as the latter roller is rolled over said tread while lying flat.

2. A tire builder's hand tool, comprising a suitable frame, rollers having parallel axes, rotatably mounted thereon, one of said rollers being adapted to have a liner strip wound thereon and the other being adapted to have a superposed tread strip and liner wound thereon by being rolled over the former while lying flat, said rollers being relatively so positioned that said liner strip will constitute the intermediate element for transmitting rotary motion from one roll to the other.

3. A tire builder's tool comprising in combination a roller for having wound thereupon an unvulcanized tread, a second roller, a liner strip on the second named roller arranged to be supplied by rotation of the first named roller, between the convolutions of said tread, and means connecting both rollers in permanent spaced relation for simultaneous independent rotation.

Signed at Detroit, Mich., July 29th, 1915.

WILLIAM THOMPSON.